J. M. CALLOW, J. W. THOMPSON AND J. T. TERRY, Jr.
METHOD AND APPARATUS FOR CONCENTRATING OXIDIZED ORES BY SULFIDATION AND FLOTATION.
APPLICATION FILED NOV. 16, 1916.
1,334,733.
Patented Mar. 23, 1920.
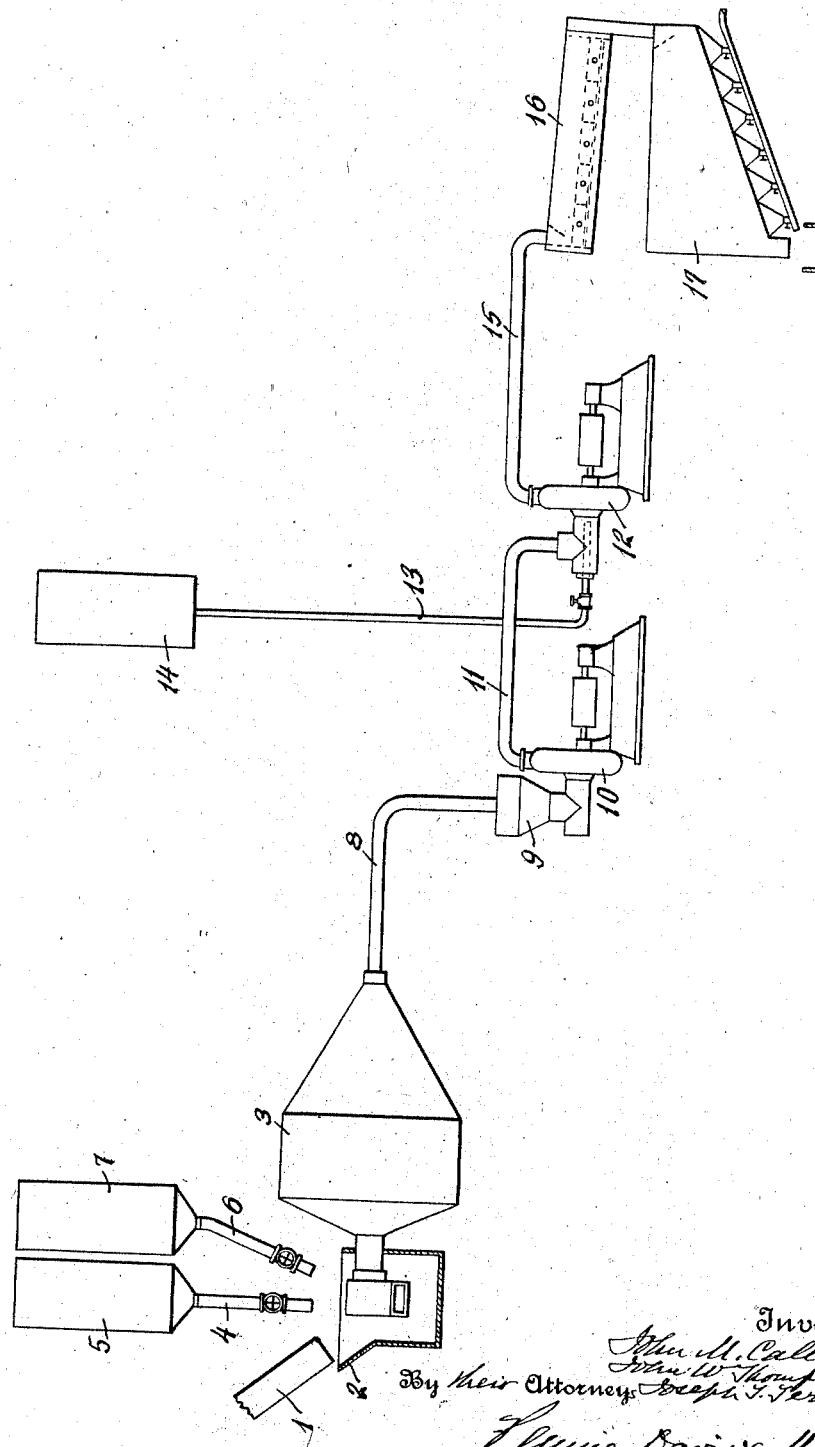

UNITED STATES PATENT OFFICE.

JOHN M. CALLOW, OF SALT LAKE CITY, UTAH, JOHN W. THOMPSON, OF SUPERIOR, ARIZONA, AND JOSEPH T. TERRY, JR., OF SALT LAKE CITY, UTAH, ASSIGNORS TO THE METALS RECOVERY COMPANY, OF NEW YORK, N. Y., A CORPORATION OF MAINE.

METHOD AND APPARATUS FOR CONCENTRATING OXIDIZED ORES BY SULFIDATION AND FLOTATION.

1,334,733.  Specification of Letters Patent.  Patented Mar. 23, 1920.

Application filed November 16, 1916. Serial No. 131,683.

*To all whom it may concern:*

Be it known that we, JOHN M. CALLOW, a subject of Great Britain, residing at Salt Lake City, county of Salt Lake, State of Utah, JOHN W. THOMPSON, a citizen of the United States, residing at Superior, Pinal county, State of Arizona, and JOSEPH T. TERRY, Jr., a citizen of the United States, residing at Salt Lake City, county of Salt Lake, State of Utah, have invented certain new and useful Improvements in Methods and Apparatus for Concentrating Oxidized Ores by Sulfidation and Flotation; and we do hereby declare the following to be a full, clear, and exact description of the invention, such as will enable others skilled in the art to which it appertains to make and use the same.

This invention relates to a novel method and apparatus for effecting the concentration of oxidized ores, such as oxid, carbonate and silicate ores, etc.

It has been heretofore proposed to effect the concentration of oxidized ores by converting the oxidized constituents superficially into sulfids, and by thereafter effecting the flotation of the sulfidized ore. Such prior proposals, in so far as we are aware, have involved a preliminary sulfidation treatment and a subsequent treatment of the sulfidized ore in a manner similar to that which is used in the treatment of natural sulfid ores; that is to say, the preliminary sulfidized ore has thereafter been mixed with oil, cresol, phenol, or other frothing agent, and subjected to an aeration and flotation treatment.

We have found that the flotation of oxidized ores, and in particular oxidized ores that are sulfidized by means of a soluble sulfid such as hydrogen sulfid, can be promoted by combining with the sulfidation of the pulp an intimate intermixture therewith of the oil or other frothing agent necessary for the subsequent froth formation. This combined sulfidizing and frothing-agent treatment can with advantage be further combined with a grinding operation for reducing the ore pulp to the required fineness; although ore pulp which has previously been reduced to the required degree of fineness can be subjected to the combined sulfidizing and frothing-agent treatment without re-grinding the ore pulp.

The invention will be described more in detail in connection with the accompanying drawing, showing an apparatus illustrative of the invention and adapted for the practice of the process of the invention.

In the apparatus illustrated, the ore pulp enters through the pipe or feed spout 1 into the feed box 2 of the ball mill 3. Oil or other frothing-agent in regulated amount enters through the pipe 4 from the supply tank 5; and the sulfidizing agent, which may be hydrogen sulfid or a solution of hydrogen sulfid or other soluble sulfid, enters in regulated amount through the pipe 6 from the generator or storage tank 7. The arrangement illustrated is adapted for the use of solutions of the sulfidizing agent, which enter the feed box and pass therefrom with the ore pulp and the oil or other frothing-agent into the ball mill 3, in which an intimate intermixture takes place and in which the combined sulfidizing and frothing-agent treatment goes on at the same time that the particles of the ore pulp are being further reduced in size.

The pulp thus treated is then discharged through the pipe 8 into the feed box 9 of a mechanical mixer, such as a centrifugal pump 10 or its equivalent, which discharges through the pipe 11 into a like centrifugal pump or mixing device 12. A supply pipe 13 is provided leading from a sulfidizing agent reservoir or generator 14 to a point intermediate the pumps 10 and 12 or to the inlet side of the mixing device 12, for the introduction of further amounts of sulfidizing agent, should this be necessary or desirable. Arrangement is thus made for a second sulfidizing operation, which may be omitted when unnecessary. From the pump or mixing device 12, the mixture passes through the pipe 15 to the blowing cell 16 and thence to the flotation cell 17, shown as a cell of the so-called Callow type.

The nature and amount of the oil or other frothing agent and of the sulfidizing agent can be varied in accordance with the ore being treated. So also, the introduction of the sulfidizing agent may take place in a single operation, or in successive operations. Where the centrifugal pump or mixing device 12 is used for effecting a further sulfidation, the ore pulp and sulfidizing agent are intimately intermixed therein, and the sulfidizing ore is then discharged to the blowing and flotation cells. The blowing cell 16 is adapted to subject the ore pulp to a blowing operation for removing therefrom any excess hydrogen sulfid or other volatile and removable gaseous constituents prejudicial to the flotation treatment. In the flotation cell 17 (which may be, for instance, of the well-known Callow type) the ore pulp is subjected to aeration and flotation by forcing air in a finely-divided form through the porous bottom of the cell.

It will be noted that the ore pulp may thus be subjected, in a single operation, to a combined sulfidizing and frothing-agent treatment, before the flotation takes place. So also, where a grinding of the ore pulp takes place at the same time as the combined sulfidizing and frothing-agent treatment, this threefold procedure may likewise be included in a single operation which results in a sulfidized and oiled pulp of the required fineness for the subsequent flotation operation.

It will be evident that other types of apparatus are available for effecting the combined sulfidizing and frothing-agent treatment or the combined sulfidizing, frothing-agent treatment, and grinding of the ore pulp, as well as for effecting the flotation of the pulp thus treated.

We claim:

1. The method of effecting the concentration of oxidized ores by flotation, which comprises subjecting the ore pulp to a combined sulfidizing and frothing-agent treatment for effecting the sulfidizing of the oxidized constituents and the simultaneous intermixture of the frothing-agent therewith, and thereafter subjecting the pulp thus treated to a froth flotation operation; substantially as described.

2. The method of effecting the concentration of oxidized ores by flotation, which comprises subjecting the ore pulp to a combined sulfidizing, frothing-agent treatment and grinding operation, for effecting the simultaneous grinding and sulfidizing of the ore pulp and intermixing of the frothing-agent therewith, and subjecting the pulp thus treated to a flotation operation; substantially as described.

3. The method of effecting the concentration of oxidized ores by flotation, which comprises subjecting the ore pulp to a combined sulfidizing and frothing-agent treatment for effecting the sulfidizing of the oxidized constituents and the simultaneous intermixture of the frothing-agent therewith, subjecting the pulp thus treated to a further sulfidizing treatment, and to a flotation operation; substantially as described.

4. The method of effecting the concentration of oxidized ores by flotation, which comprises subjecting the ore pulp to a grinding operation in the presence of a soluble sulfid and a frothing-agent for effecting the sulfidizing of the oxidized constituents of the ore and the simultaneous intermixture of the frothing-agent therewith, and subjecting the pulp thus treated to a flotation operation; substantially as described.

5. The method of effecting the concentration of oxidized ores by flotation, which comprises subjecting the ore pulp to a grinding operation in the presence of a soluble sulfid and a frothing-agent for effecting the sulfidizing of the oxidized constituents of the ore and the simultaneous intermixture of the frothing-agent therewith, subjecting the thus sulfidized and frothed ore pulp to a further sulfidizing treatment in the presence of a fresh supply of a soluble sulfid, and subjecting the pulp thus treated to a flotation operation; substantially as described.

6. The method of effecting the concentration of oxidized ores by flotation, which comprises subjecting the ore pulp to a combined sulfidizing treatment and grinding operation in the presence of oil for effecting the sulfidizing of the oxidized constituents of the ore and the simultaneous intermixture of the oil therewith, and subjecting the pulp thus treated to a flotation operation; substantially as described.

7. The method of effecting the concentration of oxidized ores by flotation, which comprises subjecting the ore pulp to a sulfidizing treatment in the presence of oil for effecting the sulfidizing of the oxidized constituents of the ore and the simultaneous intermixture therewith of the oil, and subjecting the pulp thus treated to a subsequent froth flotation operation; substantially as described.

8. An apparatus for effecting the concentration of oxidized ores by flotation, comprising a mixing device, means for simultaneously introducing into said mixing device the ore to be treated and a regulated amount of a sulfidizing agent and a regulated amount of a frothing agent, additional and independent means for subjecting the ore pulp to a further sulfidizing treatment after its discharge from said mixing device, and independent means for subjecting the ore pulp thus treated to a flotation operation; substantially as described.

9. An apparatus for effecting the concentration of oxidized ores by flotation, comprising means for grinding the ore pulp, means for independently introducing into the grinding means a regulated amount of a sulfidizing agent and a regulated amount of a frothing-agent whereby the ore pulp is subjected to a combined sulfidizing and frothing-agent treatment during the grinding, and means for subjecting the pulp thus treated to a flotation operation; substantially as described.

10. An apparatus for effecting the concentration of oxidized ores by flotation, comprising means for grinding the ore pulp, means for independently introducing into the grinding means the ore to be treated and a regulated amount of a sulfidizing agent and a regulated amount of a frothing-agent whereby the ore pulp is subjected to a combined sulfidizing and frothing-agent treatment during the grinding, a mixing device, means for forcing the ore pulp after its treatment in the grinding means under pressure into said mixing device, means for introducing a sulfidizing agent into said mixing device whereby the ore pulp is subjected to a further sulfidizing treatment, and means for subjecting the pulp thus treated to a flotation operation; substantially as described.

In testimony whereof we affix our signatures.

JOHN M. CALLOW.
JOHN W. THOMPSON.
JOSEPH T. TERRY, Jr.